Nov. 14, 1933.  R. WELLS  1,935,193

CULTIVATOR HARROW

Filed Sept. 28, 1932

Roscoe Wells
INVENTOR

BY Victor J. Evans & Co.
ATTORNEY

Patented Nov. 14, 1933

1,935,193

UNITED STATES PATENT OFFICE 1,935,193

CULTIVATOR HARROW

Roscoe Wells, Greencastle, Ind.

Application September 28, 1932
Serial No. 635,281

1 Claim. (Cl. 97—8)

This invention relates to attachments for cultivators, and has for the primary object, the provision of means whereby narrow teeth may be easily and quickly attached to a conventional type of cultivator frame for the purpose of converting the latter into a harrow especially adapted for cultivating young vegetation and which eliminates the use of fenders for protecting the vegetation and having means to permit the pitch of the teeth to be adjusted so as to allow trash and the like to escape from the teeth when acting on uncleaned ground.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary elevational view showing the attachment for connecting harrow teeth to a beam of a cultivator frame.

Figure 1:
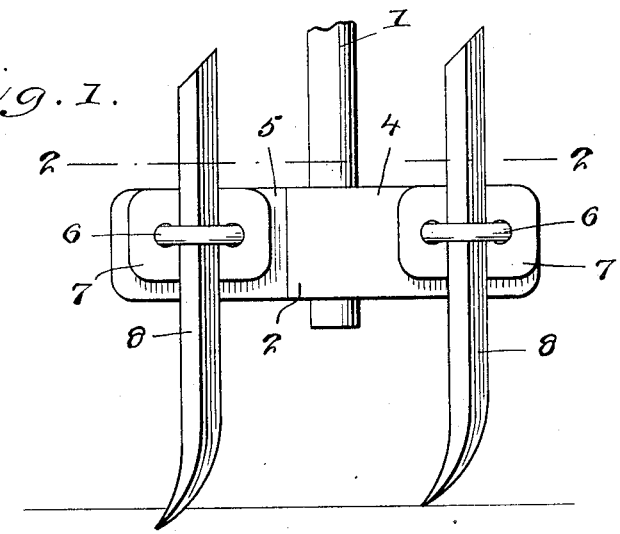
Figure 2:
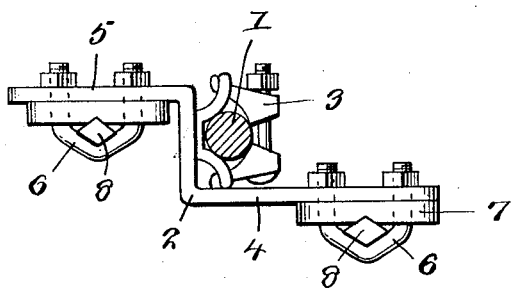
Figure 2 is a sectional view taken on the line 2—2 of Figure 1.
Figure 3:
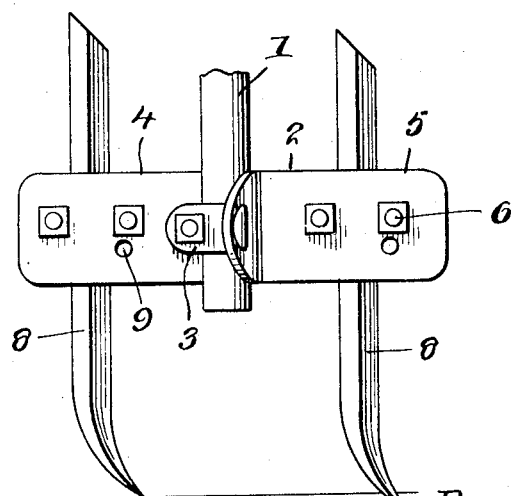
Figure 3 is a fragmentary elevational view showing means of attaching the supporting plate of the harrow teeth to the beam of the cultivator frame.

Referring in detail to the drawing, the numeral 1 indicates the beam of a conventional type of cultivator frame after the usual cultivator shovel has been removed, placing the beam in condition to have the attachment constructed in accordance with the present invention applied thereto.

An attaching plate 2 is provided with an adjustable and separable clamp 3 adapted to engage and grip the beam 1. The plate 2 is bent angularly to form teeth attaching portions 4 and 5 extending forwardly and rearwardly of the beam 1 and arranged laterally of the latter. The attaching portions 4 and 5 are provided with openings to receive U-bolts 6 that support clamping wear plates 7 against the attaching portions 4 and 5. The plates 7 are grooved and cooperate with the bight portions of the U-bolts 6 in gripping and securing to the portions 4 and 5 cultivator teeth 8 that are arranged forwardly and rearwardly of the beam 1 and laterally thereof. The portions 4 and 5 of the plate 2 and the plate 7 are provided with additional openings 9 whereby the U-bolts 6 may be adjusted to vary the pitch of the teeth. Upon reference to the drawing it will be observed that the cultivator beam securing clamp is carried on the rear side of the intermediate portion of the plate 2 and is disposed entirely within the area of said portion so that it is protected against possible damage from flying stones and also is so arranged that it will not be apt to become entangled in trash or stems of plants. It may also be noted that the rearwardly extending arm or attaching end portion of the plate is somewhat longer than the forwardly extending arm 5 so that the beam securing clamp does not interfere with the securing nuts on the adjacent harrow-tooth-securing clamp.

While I have shown and described the preferred embodiment of my invention, it will be understood that minor changes in construction, combination and arrangement of parts may be made without departing from the spirit and scope of my invention, as claimed.

Having described the invention, I claim:

An attachment for cultivators comprising a plate having end portions extending in opposite directions from its intermediate portion, a beam-securing clamp mounted on the rear side of the intermediate portion of the plate and disposed entirely within the area thereof, and means on the end portions of the plate to secure harrow teeth thereto.

ROSCOE WELLS.